(12) United States Patent
Kuehn et al.

(10) Patent No.: US 8,973,358 B2
(45) Date of Patent: Mar. 10, 2015

(54) CLOSED-LOOP HYDRAULIC SYSTEM HAVING FORCE MODULATION

(75) Inventors: Jeffrey L. Kuehn, Metamora, IL (US); Brad A. Edler, Waterloo, IL (US); Jeremy T. Peterson, Washington, IL (US); Michael T. Verkuilen, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 724 days.

(21) Appl. No.: 13/278,788

(22) Filed: Oct. 21, 2011

(65) Prior Publication Data

US 2013/0098014 A1    Apr. 25, 2013

(51) Int. Cl.
*F15B 11/17* (2006.01)
*E02F 9/22* (2006.01)

(52) U.S. Cl.
CPC .............. *E02F 9/2285* (2013.01); *F15B 11/17* (2013.01); *E02F 9/2228* (2013.01); *E02F 9/2289* (2013.01); *E02F 9/2292* (2013.01); *E02F 9/2296* (2013.01); *F15B 2211/20546* (2013.01); *F15B 2211/20561* (2013.01); *F15B 2211/265* (2013.01); *F15B 2211/3111* (2013.01); *F15B 2211/3116* (2013.01); *F15B 2211/3144* (2013.01); *F15B 2211/329* (2013.01); *F15B 2211/7053* (2013.01); *F15B 2211/7058* (2013.01)
USPC .............................................. 60/421; 60/420

(58) Field of Classification Search
USPC ................... 60/420, 421, 422, 484, 486, 468
See application file for complete search history.

(56) References Cited

U.S. PATENT DOCUMENTS 3,678,684 A * 7/1972 Sorensen ........................ 60/484
3,733,818 A * 5/1973 Veres ............................. 60/422

(Continued)

FOREIGN PATENT DOCUMENTS

EP    1 598 561    11/2005
GB    2 269 425    2/1994

(Continued)

OTHER PUBLICATIONS

Linjama, M. (2011) entitled "Digital Fluid Power-State of the Art", The 12$^{th}$ Scandinavian International Conference on Fluid Power, May 18-20, 2011 Tampere, Finland.
Zimmerman, J. PhD Student/Purdue University, Center for Compact and Efficient Fluid Power PowerPoint Presentation, 2010 Annual Meeting (Jun. 2014).

(Continued)

*Primary Examiner* — Thomas E Lazo
(74) *Attorney, Agent, or Firm* — Finnegan, Henderson, Farabow, Garrett & Dunner, LLP

(57) ABSTRACT

A hydraulic system is disclosed. The hydraulic system may have a unidirectional variable displacement first pump, a first actuator connected to the first pump via a closed-loop first circuit, and a first switching valve disposed between the first actuator and the first pump. The first switching valve may be configured to control a fluid flow direction through the first actuator. The hydraulic system may also have a second actuator connected to the first pump in parallel with the first actuator via the first circuit, and a second switching valve disposed between the second actuator and the first pump. The second switching valve may be configured to control a fluid flow direction through the second actuator. The hydraulic system may further have a modulation valve associated with the first circuit and configured to selectively modulate a pressure of the first circuit during actuation of the first or second switching valves.

18 Claims, 2 Drawing Sheets

(56) References Cited

U.S. PATENT DOCUMENTS

| | | | |
|---|---|---|---|
| 4,369,625 A * | 1/1983 | Izumi et al. | 60/422 |
| 4,449,366 A | 5/1984 | Sato et al. | |
| 4,561,249 A * | 12/1985 | Watanabe et al. | 60/421 |
| 4,586,330 A | 5/1986 | Watanabe et al. | |
| 4,768,339 A | 9/1988 | Aoyagi et al. | |
| 4,833,798 A | 5/1989 | Ehrich | |
| 5,048,293 A | 9/1991 | Aoyagi | |
| 5,329,767 A | 7/1994 | Hewett | |
| 5,680,760 A * | 10/1997 | Lunzman | 60/426 |
| 6,145,287 A * | 11/2000 | Rosskopf | 60/429 |
| 6,330,797 B1 | 12/2001 | Kondo | |
| 6,745,992 B2 | 6/2004 | Yang et al. | |
| 6,789,335 B1 | 9/2004 | Kinugawa et al. | |
| 6,918,247 B1 | 7/2005 | Warner | |
| 7,243,591 B2 | 7/2007 | Dixen et al. | |
| 7,260,931 B2 | 8/2007 | Egelja et al. | |
| 7,272,928 B2 | 9/2007 | Ariga et al. | |
| 7,412,827 B2 | 8/2008 | Verkuilen | |
| 7,434,391 B2 | 10/2008 | Asam et al. | |
| 7,490,421 B1 | 2/2009 | Pletzer et al. | |
| 7,516,613 B2 | 4/2009 | Kadlicko | |
| 7,578,127 B2 | 8/2009 | Griswold | |
| 7,743,611 B2 * | 6/2010 | Horii | 60/484 |
| 8,434,301 B2 * | 5/2013 | Fukui | 60/468 |
| 2004/0083629 A1 | 5/2004 | Kondou | |
| 2004/0123499 A1 | 7/2004 | Arii | |
| 2005/0012337 A1 | 1/2005 | Yoshimatsu | |
| 2005/0036894 A1 | 2/2005 | Oguri | |
| 2007/0044463 A1 | 3/2007 | VerKuilen et al. | |
| 2008/0250783 A1 | 10/2008 | Griswold | |
| 2008/0300757 A1 | 12/2008 | Kanayama et al. | |
| 2008/0314038 A1 | 12/2008 | Tozawa et al. | |
| 2009/0165450 A1 | 7/2009 | Cherney et al. | |
| 2009/0288408 A1 | 11/2009 | Tozawa et al. | |
| 2010/0000209 A1 | 1/2010 | Wada et al. | |
| 2010/0000211 A1 | 1/2010 | Ikeda et al. | |
| 2010/0043420 A1 | 2/2010 | Ikeda et al. | |
| 2010/0107620 A1 | 5/2010 | Nelson et al. | |
| 2010/0115936 A1 | 5/2010 | Williamson et al. | |
| 2010/0162593 A1 | 7/2010 | Hughes, IV et al. | |
| 2010/0162885 A1 | 7/2010 | Hughes, IV et al. | |
| 2010/0163258 A1 | 7/2010 | Hughes, IV et al. | |
| 2010/0218493 A1 | 9/2010 | Nakamura et al. | |
| 2011/0029206 A1 | 2/2011 | Kang et al. | |
| 2011/0030364 A1 | 2/2011 | Persson et al. | |

FOREIGN PATENT DOCUMENTS

| | | |
|---|---|---|
| JP | 56-016735 | 2/1981 |
| JP | 57-134007 | 8/1982 |
| JP | 58-044133 | 3/1983 |
| JP | 02-108733 | 4/1990 |
| JP | 06-057786 | 3/1994 |
| JP | 06-101249 A | 4/1994 |
| JP | 10-96402 | 4/1998 |
| JP | 2005-076781 A | 3/2005 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |

OTHER PUBLICATIONS

Zimmerman, J. et al., "Hybrid Displacement Controlled Multi-Actuator Hydraulic Systems", The Twelfth Scandinavian International Conference on Fluid Power, Tampere, Finland (May 18-20, 2011).

Linde Hydraulics Brochure entitled "HPV-02. Variable Pumps for Closed Loop Operation", pp. 1-36, Feb. 2002.

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic und pneumatic 20 (1976) Nr. 4.

U.S. Appl. No. 13/222,895 by Patrick Opdenbosch et al., entitled "Meterless Hydraulic System Having Displacement Control Valve" filed Aug. 31, 2011.

U.S. Appl. No. 13/222,945 by Patrick Opdenbosch et al., entitled "Meterless Hydraulic System Having Restricted Primary Makeup" filed Aug. 31, 2011.

U.S. Appl. No. 13/222,990 by Patrick Opdenbosch et al., entitled "Meterless Hydraulic System Having Load-Holding Bypass" filed Aug. 31, 2011.

U.S. Appl. No. 13/249,932 by Bryan E. Nelson et al., entitled "Regeneration Configuration for Closed-Loop Hydraulic Systems" filed Sep. 30, 2011.

U.S. Appl. No. 13/250,067 by Patrick Opdenbosch, entitled "Meterless Hydraulic System Having Multi-Actuator Circuit" filed Sep. 30, 2011.

U.S. Appl. No. 13/250,250 by Patrick Opdenbosch, entitled "Meterless Hydraulic System Having Multi-Actuator Circuit" filed Sep. 30, 2011.

U.S. Appl. No. 13/250,002 by Michael L. Knussman, entitled "Closed-Loop Hydraulic System Having Energy Recovery" filed Sep. 30, 2011.

U.S. Appl. No. 13/250,171 of Patrick Opdenbosch, entitled "Meterless Hydraulic System Having Pump Protection" filed Sep. 30, 2011.

U.S. Appl. No. 13/278,720 of Patrick Opdenbosch, entitled "Meterless Hydraulic System Having Multi-Circuit Recuperation" filed Oct. 21, 2011.

U.S. Appl. No. 13/278,623 of Patrick Opdenbosch, entitled "Closed-Loop Hydraulic System Having Flow Combining and Recuperation" filed Oct. 21, 2011.

U.S. Appl. No. 13/278,924 of Patrick Opdenbosch et al., entitled "Meterless Hydraulic System Having Flow Sharing and Combining Functionality" filed Oct. 21, 2011.

U.S. Appl. No. 13/279,064 of Patrick Opdenbosch et al., entitled "Meterless Hydraulic System Having Flow Sharing and Combining Functionality" filed Oct. 21, 2011.

U.S. Appl. No. 13/279,177 of Patrick Opdenbosch et al., entitled "Meterless Hydraulic System Having Flow Sharing and Combining Functionality" filed Oct. 21, 2011.

U.S. Appl. No. 13/278,556 of Michael L. Knussman, entitled "Closed-Loop Hydraulic System Having Regeneration Configuration" filed Oct. 21, 2011.

U.S. Appl. No. 12/278,894 of Patrick Opdenbosch, entitled "Hydraulic System Having Flow Combining Capabilities" filed Oct. 21, 2011.

U.S. Appl. No. 13/278,895 of Michael L. Knussman et al., entitled "Hydraulic System" filed Oct. 21, 2011.

U.S. Appl. No. 13/278,939 of Michael L. Knussman, entitled "Hydraulic System" filed Oct. 21, 2011.

U.S. Appl. No. 13/278,745 of Brad A. Edler et al., entitled "Closed-Loop System Having Multi-Circuit Flow Sharing" filed Oct. 21, 2011.

U.S. Appl. No. 13/278,650 of Michael L. Knussman, entitled "Hydraulic System Having Multiple Closed-Loop Circuits" filed Oct. 21, 2011.

U.S. Appl. No. 13/278,479 of Brad A. Edler et al., entitled "Closed-Loop Hydraulic System Having Priority-Based Sharing" filed Oct. 21, 2011.

U.S. Appl. No. 13/278,589 of Michael L. Knussman, entitled "Hydraulic System Having Multiple Closed-Loop Circuits" filed Oct. 21, 2011.

U.S. Appl. No. 13/278,491 of Jeffrey L. Kuehn et al., entitled "Meterless Hydraulic System Having Sharing and Combining Functionality" filed Oct. 21, 2011.

U.S. Appl. No. 13/278,935 of Michael L. Knussman et al., entitled "Hydraulic System" filed Oct. 21, 2011.

* cited by examiner

CLOSED-LOOP HYDRAULIC SYSTEM HAVING FORCE MODULATION

TECHNICAL FIELD

The present disclosure relates generally to a hydraulic system and, more particularly, to a closed-loop hydraulic system having force modulation.

BACKGROUND

A conventional hydraulic system includes a pump that draws low-pressure fluid from a tank, pressurizes the fluid, and makes the pressurized fluid available to multiple different actuators for use in moving the actuators. In this arrangement, a speed and/or force of each actuator can be independently controlled by selectively throttling (i.e., restricting) a flow of the pressurized fluid from the pump into each actuator. For example, to move a particular actuator at a higher speed and/or with a higher force, the flow of fluid from the pump into the actuator is restricted by only a small amount. In contrast, to move the same or another actuator at a lower speed and/or with a lower force, the restriction placed on the flow of fluid is increased. Although adequate for many applications, the use of fluid restriction to control actuator speed or force can result in flow losses that reduce an overall efficiency of a hydraulic system.

An alternative type of hydraulic system is known as a closed-loop hydraulic system. A closed-loop hydraulic system generally includes a pump connected in closed-loop fashion to a single actuator or to a pair of actuators operating in tandem. During operation, the pump draws fluid from one chamber of the actuator(s) and discharges pressurized fluid to an opposing chamber of the same actuator(s). To move the actuator(s) at a higher speed, the pump discharges fluid at a faster rate. To move the actuator with a lower speed, the pump discharges the fluid at a slower rate. A closed-loop hydraulic system is generally more efficient than a conventional hydraulic system because the speed of the actuator(s) is controlled through pump operation as opposed to fluid restriction. That is, the pump is controlled to only discharge as much fluid as is necessary to move the actuator(s) at a desired speed, and no throttling of a fluid flow is required.

An exemplary closed-loop hydraulic system is disclosed in U.S. Patent Publication 2008/0250785 of Griswold that published on Oct. 16, 2008 (the '785 publication). In the '785 publication, a multi-actuator closed-loop hydraulic system is described. The hydraulic system includes a first circuit having a first actuator connected to a first pump in a closed-loop manner, and a second circuit having a second actuator connected to a second pump in a closed-loop manner. The hydraulic system also includes a third pump connected in an open-loop manner to the first and second circuits to provide additional flow to the first and second circuits.

The closed-loop hydraulic system of the '785 publication described above may be less than optimal. In particular, the system does not disclose a way to modulate a force of any of the actuators.

The hydraulic system of the present disclosure is directed toward solving one or more of the problems set forth above and/or other problems of the prior art.

SUMMARY

In one aspect, the present disclosure is directed to a hydraulic system. The hydraulic system may include a unidirectional variable displacement first pump, a first actuator connected to the first pump via a closed-loop first circuit, and a first switching valve disposed between the first actuator and the first pump. The first switching valve may be configured to control a fluid flow direction through the first actuator. The hydraulic system may also include a second actuator connected to the first pump in parallel with the first actuator via the first circuit, and a second switching valve disposed between the second actuator and the first pump. The second switching valve may be configured to control a fluid flow direction through the second actuator. The hydraulic system may further include a modulation valve associated with the first circuit. The modulation valve may be configured to selectively modulate a pressure of the first circuit during actuation of the first or second switching valves.

In another aspect, the present disclosure is directed to a method of operating a hydraulic system. The method may include discharging pressurized fluid with a first pump in a single direction, directing the pressurized fluid to a first linear actuator via a closed-loop first circuit, and selectively switching a fluid flow direction through the first actuator via a first switching valve. The method may also include directing the pressurized fluid to a second linear actuator via the closed-loop first circuit, and selectively switching a fluid flow direction through the second actuator via a second switching valve. The method may additionally include selectively adjusting an amount of fluid from the first circuit that bypasses the first or second actuators via a modulation valve during actuation of the first or second switching valves.

DETAILED DESCRIPTION

Figure 1:
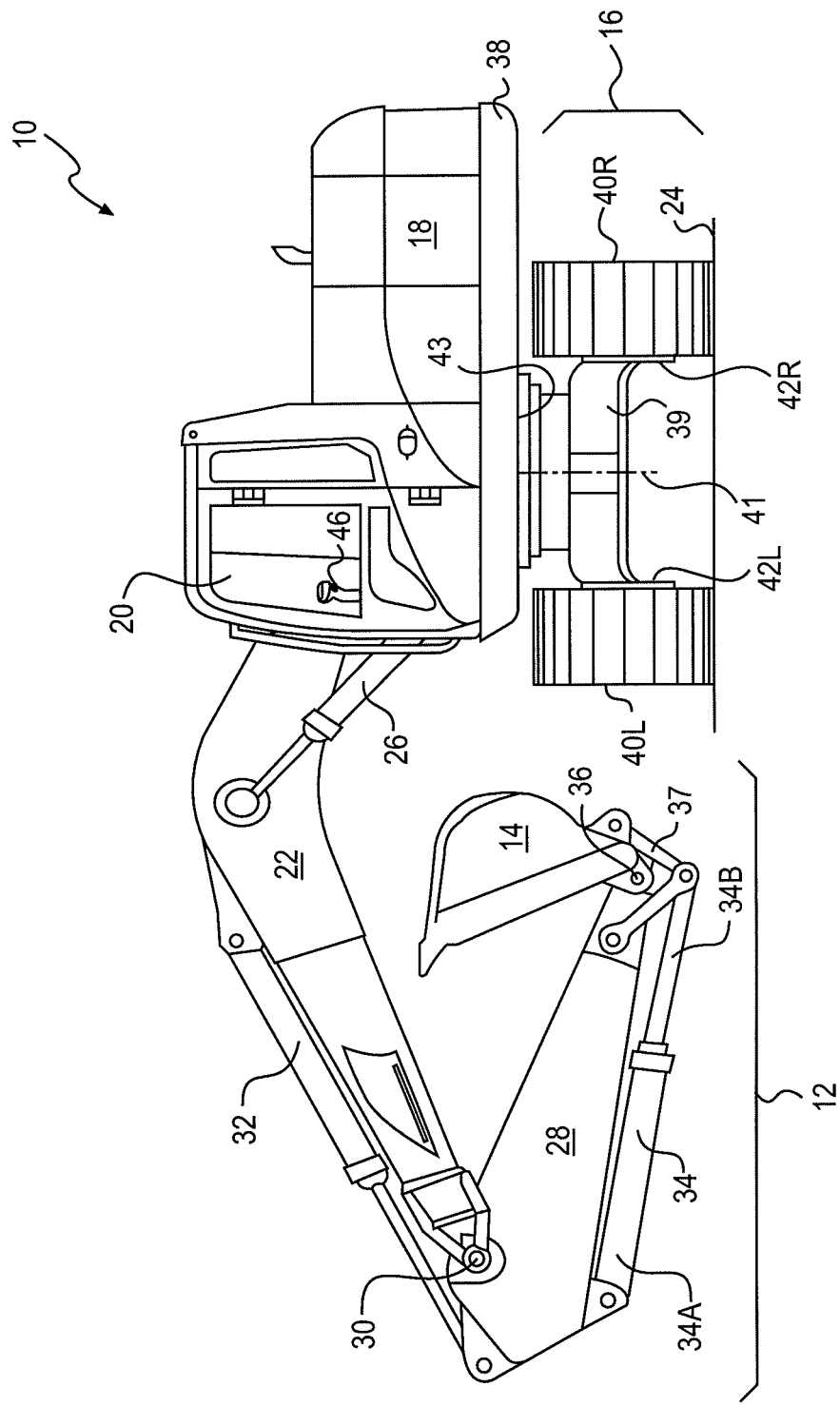
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or another earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by linear and rotary fluid actuators to move work tool 14. For example, implement system 12 may include a boom 22 that is vertically pivotal about a horizontal axis (not shown) relative to a work surface 24 by a pair of adjacent, double-acting, hydraulic cylinders 26 (only one shown in FIG. 1). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected at a base end to a body 38 of machine 10. Body 38 may be connected to an undercarriage 39 to swing about a vertical axis 41 by a hydraulic swing motor 43. Stick 28 may pivotally connect a distal end of boom 22 to work tool 14 by way of axes 30 and 36.

Numerous different work tools 14 may be attachable to a single machine 10 and operator controllable. Work tool 14 may include any device used to perform a particular task such as, for example, a bucket (shown in FIG. 1), a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction about pivot axis 41, work tool 14 may alternatively or additionally rotate relative to stick 28, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks, such as wheels, belts, or other known traction devices. Machine 10 may be steered by generating a speed and/or rotational direction difference between left and right travel motors 42L, 42R, while straight travel may be facilitated by generating substantially equal output speeds and rotational directions of left and right travel motors 42L, 42R.

Power source 18 may embody an engine such as, for example, a diesel engine, a gasoline engine, a gaseous fuel-powered engine, or another type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving the linear and rotary actuators of implement system 12.

Operator station 20 may include devices that receive input from a machine operator indicative of desired maneuvering. Specifically, operator station 20 may include one or more operator interface devices 46, for example a joystick (shown in FIG. 1), a steering wheel, or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
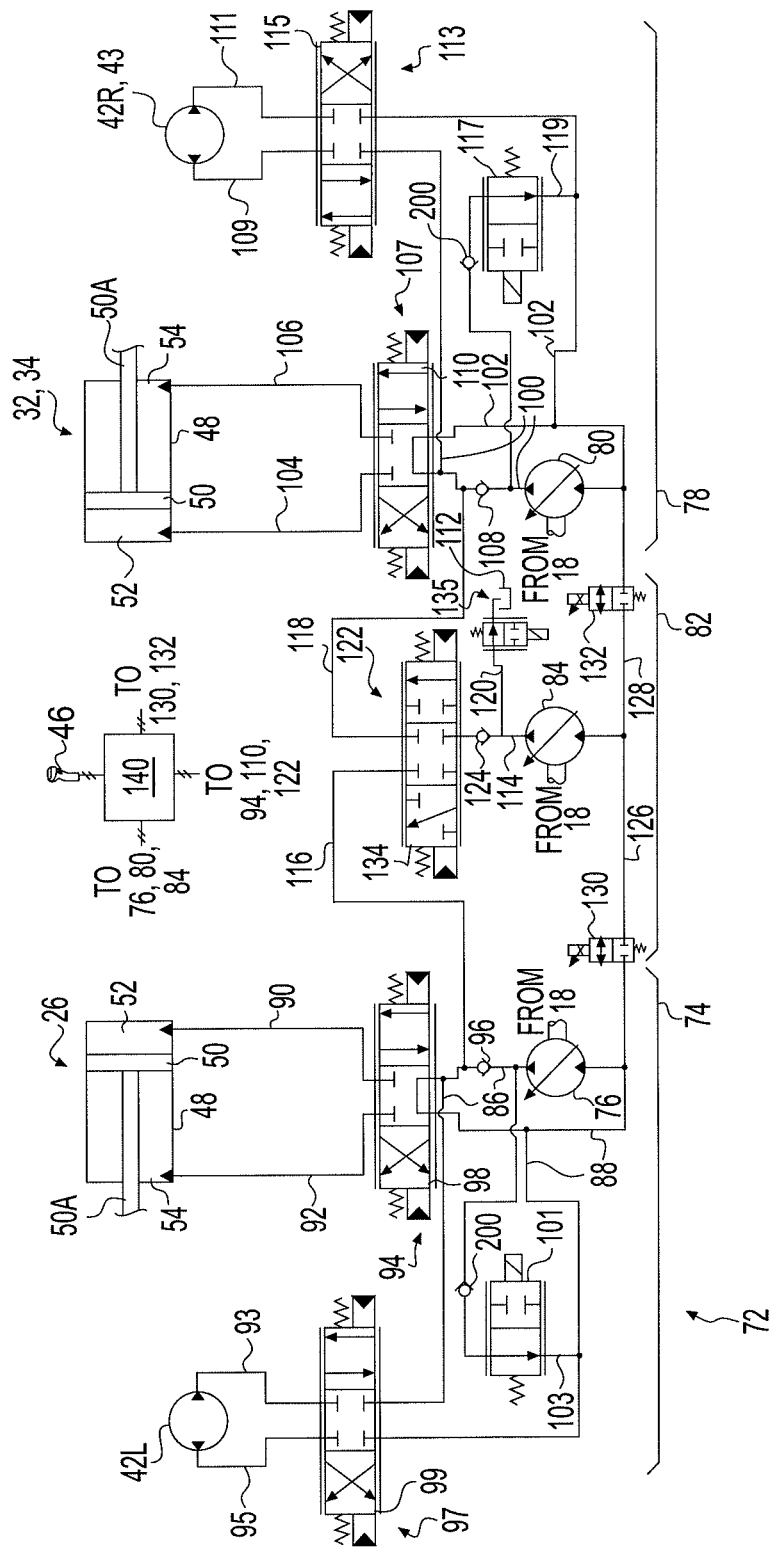
FIG. 2 is a schematic illustration of an exemplary disclosed hydraulic system that may be used in conjunction with the machine of FIG. 1.

Two exemplary linear actuators and two exemplary rotary actuators are shown in the schematic of FIG. 2. It should be noted that, while two specific linear and two specific rotary actuators are shown, the depicted actuators may represent any one or more of the linear actuators (e.g., hydraulic cylinders 26, 32, 34) or the rotary actuators (left travel, right travel, or swing motors 42L, 42R, 43) of machine 10.

The linear actuators may each include a tube 48 and a piston assembly 50 arranged within tube 48 to form a first chamber 52 and an opposing second chamber 54. In one example, a rod portion 50A of piston assembly 50 may extend through an end of second chamber 54. As such, each second chamber 54 may be considered the rod-end chamber of the respective actuator, while each first chamber 52 may be considered the head-end chamber. First and second chambers 52, 54 of each hydraulic actuator may be selectively supplied with pressurized fluid from one or more pumps and drained of the pressurized fluid to cause piston assembly 50 to displace within tube 48, thereby changing the effective length of the actuator to move work tool 14. A flow rate of fluid into and out of first and second chambers 52, 54 may relate to a translational velocity of each actuator, while a pressure differential between first and second chambers 52, 54 may relate to a force imparted by each actuator on work tool 14.

The rotary actuators, may function in a manner similar to the linear actuators. That is, each rotary actuator may also include first and second chambers (not shown) located to either side of a pumping mechanism (not shown) such as an impeller, plunger, or series of pistons. When the first chamber is filled with pressurized fluid from one or more pumps and the second chamber is simultaneously drained of fluid, the pumping mechanism may be urged to rotate in a first direction by a pressure differential across the pumping mechanism. Conversely, when the first chamber is drained of fluid and the second chamber is simultaneously filled with pressurized fluid, the pumping mechanism may be urged to rotate in an opposite direction by the pressure differential. The flow rate of fluid into and out of the first and second chambers may determine a rotational velocity of each actuator, while a magnitude of the pressure differential across the pumping mechanism may determine an output torque. Although the rotary actuators are shown as fixed-displacement type motors, it is contemplated that the rotary actuators could alternatively embody variable-displacement type motors, if desired.

Machine 10 may include a hydraulic system 72 having a plurality of fluid components that cooperate with the hydraulic actuators to move work tool 14 and machine 10. In particular, hydraulic system 72 may include, among other things, a closed-loop first circuit 74 fluidly connecting a first pump 76 with a first linear actuator (e.g., hydraulic cylinder 26) and a first rotary actuator (e.g., left travel motor 42L) of machine 10, a closed-loop second circuit 78 fluidly connecting a second pump 80 with a second linear actuator (e.g., hydraulic cylinder 32 or hydraulic cylinder 34) and a second rotary actuator (e.g., right-travel motor 42R or swing motor 43), and a third circuit 82 selectively connecting a third pump 84 with first or second circuits 74, 78. It is contemplated that hydraulic system 72 may include additional and/or different circuits or components, if desired, such as a charge circuit having one or more makeup valves, relief valves, pressure sources, and/or storage devices; switching valves; pressure-compensating valves, and other circuits or valves known in the art.

First circuit 74 may include multiple different passages that fluidly connect first pump 76 to the first linear and rotary actuators and, in some configurations, to other actuators of machine 10, in a parallel, closed-loop manner. For example, first pump 76 may be connected to the first linear actuator via a discharge passage 86, an intake passage 88, a head-end passage 90, and a rod-end passage 92. A first switching valve 94 may be disposed between discharge and intake passages 86, 88 and head- and rod-end passages 90, 92 to control fluid flow direction through first circuit 74. First pump 76 may additionally be connected to the first rotary actuator via discharge passage 86, intake passage 88, a first chamber passage 93, and a second chamber passage 95. A second switching valve 97 may be disposed between discharge and intake passages 86, 88 and first and second chamber passages 93, 95. A first check valve 96 may be disposed within discharge passage 86 to help ensure a unidirectional flow of fluid through first pump 76. A first modulation valve 101 may be disposed within a bypass passage 103 extending between discharge and intake passages 86, 88 to help regulate a pressure of first circuit 74 and thereby a force of the first linear and/or rotary actuators. In the disclosed embodiment, the connection of bypass passage 103 to discharge passage 86 may be located upstream of check valve 96, such that bypass passage 103 may be prevented from bypassing fluid from another circuit (e.g., from third circuit 82) into discharge passage 86.

First switching valve 94 may include a pilot-operated spool element 98 movable between three positions. When spool element 98 is in the first position (right-most position shown in FIG. 2), discharge passage 86 may be fluidly connected with head-end passage 90, while intake passage 88 may be fluidly connected with rod-end passage 92 such that fluid from first pump 76 flows through the first linear actuator in a first direction causing the first linear actuator to move in a first direction (e.g., in an extending direction). When spool element 98 is in the second position (middle position shown in FIG. 2), fluid through first switching valve 94 may be blocked. When spool element 98 is in the third position (left-most position shown in FIG. 2), discharge passage 86 may be fluidly connected with rod-end passage 92, while intake passage 88 may be fluidly connected with head-end passage 90 such that fluid from first pump 76 flows through the first linear actuator in a second direction opposite the first direction causing the first linear actuator to move in a second direction (e.g., in a retracting direction). Spool element 98 may be spring-biased to the second position, and pilot-operated to move to any position between the first, second, or third positions.

Second switching valve 97 may be substantially identical to first switching valve 94, and include a pilot-operated spool element 99 movable between three positions. When spool element 99 is in the first position (right-most position shown in FIG. 2), discharge passage 86 may be fluidly connected with first chamber passage 93, while intake passage 88 may be fluidly connected with second chamber passage 95 such that fluid from first pump 76 flows through the first rotary actuator in a first direction causing left traction device 40L to move in a first direction (e.g., in a forward traveling direction). When spool element 99 is in the second position (middle position shown in FIG. 2), fluid flow through second control valve 97 may be blocked. When spool element 99 is in the third position (left-most position shown in FIG. 2), discharge passage 86 may be fluidly connected with second chamber passage 95, while intake passage 88 may be fluidly connected with first chamber passage 93 such that fluid from first pump 76 flows through the first rotary actuator in a second direction opposite the first causing left traction device 40L to move in a second direction (e.g., in a rearward traveling direction). Spool element 99 may be substantially identical to spool element 98.

First modulation valve 101 may be solenoid operated to move to any position between a flow-passing first position and a flow-blocking second position such that a flow rate of fluid from first pump 76 bypassing the first linear and rotary actuators may be regulated. In particular, when first modulation valve 101 is in the flow-passing position, all of the flow from first pump 76 may bypass the first linear and rotary actuators and return back to first pump 76 via bypass passage 103 with substantially no restriction being placed on the fluid by first modulation valve 101. Because there may be little resistance to the flow of fluid when first modulation valve 101 is fully in the first position, the pressure of the fluid within first circuit 74 may remain low. This low-pressure fluid may result in little if any force capacity of the first linear or rotary actuators. As first modulation valve 101 is moved toward the flow-blocking position, a greater resistance may be placed on the flow of bypassing fluid within first circuit 74, thereby causing a corresponding rise in the pressure of all fluid within first circuit 74 and in the resulting force capacity of the first linear and rotary actuators. Accordingly, as an operator of machine 10 requests a greater force from the first linear and/or rotary actuators, first modulation valve 101 may be moved toward the flow-blocking position. When first modulation valve 101 is moved fully to the flow-blocking position, substantially no fluid may be bypassing the first linear and rotary actuators such that full actuator force may be available to the operator. It should be noted that, when first modulation valve 101 is fully in the flow-blocking position, first modulation valve 101 may no longer be restricting the flow of any fluid through first circuit 74. Accordingly, any metering losses associated with first modulation valve 101 may only be experienced when first modulation valve 101 is metering (i.e., in a position other than the first or second positions). A check valve 200 may be associated with first modulation valve 101 to help ensure a unidirectional flow of fluid through first modulation valve 101.

Second circuit 78, like first circuit 74, may also include multiple different passages that fluidly connect second pump 80 to the second linear and rotary actuators and, in some configurations, to other actuators of machine 10, in a parallel, closed-loop manner. For example, second pump 80 may be connected to the second linear actuator via a discharge passage 100, an intake passage 102, a head-end passage 104, and a rod-end passage 106. A third switching valve 107 may be disposed between discharge and intake passages 100, 102 and head- and rod-end passages 104, 106 to control fluid flow direction through second circuit 78. In addition, second pump 80 may be connected to the second rotary actuator via discharge passage 100, intake passage 102, a first chamber passage 109, and a second chamber passage 111. A fourth switching valve 113 may be disposed between discharge and intake passages 100, 102 and first and second chamber passages 109, 111. A second check valve 108 may be disposed within discharge passage 100 to help ensure a unidirectional flow of fluid through second pump 80. A second modulation valve 117 may be disposed within a bypass passage 119 extending between discharge and intake passages 100, 102 to help regulate a pressure of second circuit 78 and thereby a force of the second linear and/or rotary actuators.

Third and fourth switching valves 107, 113 may be substantially identical to first and second switching valves 94, 97, and include pilot-operated spool elements 110, 115, respectively, that are movable between three positions to control the second linear and rotary actuators in the same manner described above relative to first linear and rotary actuators. Second modulation valve 117 may be substantially identical to first modulation valve 101, but be solenoid-operated to control a flow rate of fluid from second pump 80 bypassing the second linear and rotary. Like first modulation valve 101, a check valve 200 may be associated with second modulation valve 117 to help ensure a unidirectional flow of fluid through second modulation valve 117. For these reason, repeated description of the flow-switching and pressure-regulating operations will be omitted.

Third circuit 82 may include multiple different passages that fluidly connect third pump 84 to first circuit 74, to second circuit 78, and/or to a low-pressure tank. For example, third pump 84 may be connected to discharge passage 86 of first circuit 74, at a location downstream of first check valve 96, via a common discharge passage 114 and a first-circuit passage 116. Alternately, third pump 84 may be connected to discharge passage 100 of second circuit 78, at a location downstream of second check valve 108, via common discharge passage 114 and a second-circuit passage 118. Finally, third pump 84 may be connected to low-pressure tank 112 via common discharge passage 114 and a return passage 120. A control valve 122 may be disposed between common discharge passage 114 and first-circuit passage 116, second circuit passage 118, and return passage 120 to control fluid flow through third circuit 82. A third check valve 124 may be disposed within common discharge passage 114 to help ensure a unidirectional flow of fluid through third pump 84.

Third pump 84 may be configured to draw fluid from one or both of first and second circuits 74, 78. Specifically, third pump 84 may be connected to intake passage 88 of first circuit 74 via a first intake passage 126, and connected to intake passage 102 of second circuit 78 via a second intake passage 128. A first isolation valve 130 may be disposed within first intake passage 126, while a second isolation valve 132 may be disposed within second intake passage 128.

Control valve 122 may be a four-way valve having a pilot-operated spool element 134 movable between three positions. When spool element 134 is in the first position (left-most position shown in FIG. 2), common discharge passage 114 may be fluidly connected with first-circuit passage 116, while second-circuit and return passages 118, 120 may be substantially isolated from common discharge passage 114. When spool element 134 is in the second position (middle position shown in FIG. 2), common discharge passage 114 may be substantially isolated first- and second-circuit passages 116, 118. When spool element 134 is in the third position (right-most position shown in FIG. 2), common discharge passage 114 may be fluidly connected with second-circuit passage 118, while first-circuit and return passages 116, 120 may be substantially isolated from common discharge passage 114.

Spool element 134 may be spring-biased to the second position, and pilot-operated to move to any position between the first, second, and third positions such that a variable amount of fluid from third pump 84 may flow either into first circuit 74 or second circuit 78 (i.e., spool element 134 may be variable position). Spool element 134 may be moved to the second position, or to a position between the first and second positions or between the second and third positions (i.e., to an in-between position) during a regeneration event, when an amount of fluid from the first or second circuits 74, 78 directed to third pump 84 is greater than an amount of fluid required from third pump 84 by first or second circuits 74, 78.

In some situations, an unloading valve 135 may be associated with third pump 84. Unloading valve 135 may be used to gradually lower and/or increase a pressure within common discharge passage 114 during movement of spool element 134 to thereby help reduce shock loading of first, second, and/or third circuits 74, 78, 82. Unloading valve 135 may be moveable between two positions, including a flow-blocking position and a flow-passing position. Unloading valve 135 may be solenoid-operated toward the flow-blocking position, and spring-biased toward the flow passing position. As unloading valve 135 moves toward the flow-passing position, fluid from within common discharge passage 114 may be increasingly allowed to flow into low-pressure tank 112, thereby reducing the pressure of common discharge passage 114. As unloading valve 135 moves toward the flow-blocking position, fluid from within common discharge passage 114 may be increasingly blocked from low-pressure tank 112, thereby increasing the pressure of common discharge passage 114.

In addition to reducing shock loading of the different circuits during movement of spool element 134, unloading valve 135 may also be selectively utilized to recover energy from hydraulic fluid passing through third circuit 84. That is, when high-pressure fluid passes through third pump 84 and is allowed to flow into tank 112 via unloading valve 135, the power required to drive third pump 84 may be reduced. In fact, in some situations, third pump 84 may even be driven as a motor by the fluid, such that energy within the pressurized fluid may be recaptured and returned to power source 18 via third pump 84.

First and second isolation valves 130, 132 may each be configured to move between a flow-passing position and a flow-blocking position (shown in FIG. 2). First and second isolation valves 130, 132 may be spring-biased toward the flow-blocking position, and solenoid-operated to move to the flow-passing position. It is contemplated that, in some embodiments, first and/or second isolation valves 130, 132 may be moved to any position between the flow-passing and flow-blocking positions, if desired.

First, second, and third pumps 76, 80, 84 may each be substantially identical variable-displacement type pumps that are controlled to draw fluid from the actuators of machine 10 and discharge the fluid at a specified elevated pressure back to the actuators in a single direction (i.e., pumps 76, 80, 84 may be unidirectional pumps). Pumps 76, 80, 84 may each include a stroke-adjusting mechanism, for example a swashplate, a position of which is hydro-mechanically adjusted based on, among other things, a desired speed of the actuators to thereby vary an output (e.g., a discharge rate. The displacement of pumps 76, 80, 84 may be adjusted from a zero displacement position at which substantially no fluid is discharged, to a maximum displacement position at which fluid is discharged at a maximum rate into discharge passages 86, 100, 114, respectively. Pumps 76, 80, 84 may be drivably connected to power source 18 of machine 10 by, for example, a countershaft, a belt, or in another suitable manner. Alternatively, pumps 76, 80, 84 may be indirectly connected to power source 18 via a torque converter, a gear box, an electrical circuit, or in any other manner known in the art. It is contemplated that pumps 76, 80, 84 may be connected to power source 18 in tandem (e.g., via the same shaft) or in parallel (e.g., via a gear train), as desired.

During operation of machine 10, the operator may utilize interface device 46 to provide a signal that identifies a desired movement of the various linear and/or rotary actuators to a controller 140. Based upon one or more signals, including the signal from interface device 46 and, for example, signals from various pressure sensors (not shown) and/or position sensors (not shown) located throughout hydraulic system 72, controller 140 may command movement of the different valves and/or displacement changes of the different pumps and motors to advance a particular one or more of the linear and/or rotary actuators to a desired position in a desired manner (i.e., at a desired speed and/or with a desired force).

Controller 140 may embody a single microprocessor or multiple microprocessors that include components for controlling operations of hydraulic system 72 based on input from an operator of machine 10 and based on sensed or other known operational parameters. Numerous commercially available microprocessors can be configured to perform the functions of controller 140. It should be appreciated that controller 140 could readily be embodied in a general machine microprocessor capable of controlling numerous machine functions. Controller 140 may include a memory, a secondary storage device, a processor, and any other components for running an application. Various other circuits may be associated with controller 140 such as power supply circuitry, signal conditioning circuitry, solenoid driver circuitry, and other types of circuitry.

INDUSTRIAL APPLICABILITY

The disclosed hydraulic system may be applicable to any machine where improved hydraulic efficiency and control is desired. The disclosed hydraulic system may provide for improved efficiency through the use of closed-loop technology, flow-sharing, and flow-combining. The disclosed hydraulic system may provide for improved control through the use of pressure modulation. Operation of hydraulic system 72 will now be described.

During operation of machine 10, an operator located within station 20 may tilt interface device 46 in a particular direction by a particular amount and/or with a particular speed to command motion of work tool 14 in a desired direction, at a desired velocity, and with a desired force. One or more corresponding signals generated by interface device 46 may be provided to controller 140 indicative of the desired motion, along with machine performance information, for example sensor data such a pressure data, position data, speed data, pump or motor displacement data, and other data known in the art.

For example, in response to the signals from interface device 46 indicative of a desire to lift boom 22 with an increasing velocity, and based on the machine performance information, controller 140 may generate control signals directed to the stroke-adjusting mechanism of first pump 76, to first switching valve 94, and/or to first modulation valve 101. To drive the first linear actuator (e.g., hydraulic cylinders 26) at an increasing speed in an extending direction, controller 140 may generate a first control signal that causes first pump 76 of first circuit 74 to increase its displacement and discharge pressurized fluid into discharge passage 86 at a greater rate and a simultaneous second control signal that causes spool element 98 of first switching valve 94 to move into its first position (if not already in the first position). As described above, when spool element 98 moves into its first position, discharge passage 86 may be fluidly communicated with head-end passage 90 and rod-end passage 92 may be fluidly communicated with intake passage 88. When fluid from first pump 76 is directed into first chamber 52, return fluid from second chamber 54 of the first linear actuator and/or from the other linear or rotary actuators of first circuit 74 may flow back into first pump 76 in closed-loop manner. At this time the extending speed of the first linear actuator may be related to the discharge rate of first pump 76 (and the flow rate of fluid within bypass passage 103), while a force exerted by the first linear actuator on work tool 14 may be related to a pressure of the fluid. Isolation valve 130 may be in its flow-blocking position during normal extensions of the first linear actuator. Extension of the second linear actuator shown in FIG. 2 may be initiated in a similar manner.

During initial movements of the first linear actuator, first modulation valve 101 may be commanded by controller 140 to move a distance towards its flow-blocking position such that pressure within first circuit 74 may begin to build. The extent of movement toward the flow-blocking position may correspond to the tilt angle, speed, or other operational characteristic of interface device 46.

The first linear actuator, during extension, may exert an upward force on boom 22 that is related to the pressure of fluid within first circuit 74, as regulated by first modulation valve 101. This force may be caused to increase until boom 22 starts to lift upwards, at which time the force may remain substantially constant. In some situations, however, the force exerted by hydraulic cylinder 26 may become insufficient to continue lifting boom 22 after movement of boom 22 has already been initiated, for example when work tool 14 suddenly becomes loaded to a greater degree. At this point in time, movement of boom 22 may cease. To then generate further movement of boom 22, the operator may be required to further manipulate interface device 46, for example to tilt interface device 46 to a greater angle.

As interface device 46 is tilted to a greater angle, controller 140 may cause first modulation valve 101 to move a greater distance toward the flow-blocking position. When first modulation valve moves a greater distance toward the flow-blocking position, less fluid may bypass the first linear actuator and the pressure within first circuit 74 may increase by a proportional amount, thereby also increasing the force exerted by the first linear actuator on boom 22, until boom 22 again starts to move. In this manner, the operator may be provided with force control over the first linear actuator. Force modulation of the second linear actuator may be regulated in the same manner.

To drive the first linear actuator at an increasing speed in a retracting direction (e.g., to lower boom 22), controller 140 may generate a first control signal that causes first pump 76 of first circuit 74 to increase its displacement and discharge pressurized fluid into discharge passage 86 at a greater rate and a simultaneous second control signal that causes spool element 98 of first switching valve 94 to move into its third position (if not already in its third position). As described above, when spool element 98 moves into its third position, discharge passage 86 may be fluidly communicated with rod-end passage 92 and head-end passage 90 may be fluidly communicated with intake passage 88. When fluid from first pump 76 is directed into second chamber 54, return fluid from first chamber 52 of the first linear actuator and/or from the other linear or rotary actuators of first circuit 74 may flow back into first pump 76 in closed-loop manner. First isolation valve 130 may be in its flow-blocking position during normal retractions of the first linear actuator. Retraction of the second linear actuator shown in FIG. 2 may be initiated in a similar manner.

The rates of fluid flow into and out of the first and second linear actuators may not be equal during normal extension and retraction operations. In particular, because of the location of rod portion 50A within second chamber 54, piston assembly 50 may have a reduced pressure area within second chamber 54, as compared with a pressure area within first chamber 52. Accordingly, during retraction of the hydraulic actuators, more fluid may be forced out of first chamber 52 than can be consumed by second chamber 54 and, during extension, more hydraulic fluid may be consumed by first chamber 52 than is forced out of second chamber 54. In order to accommodate the additional fluid required during extension, the output of third pump 84 may be selectively directed into first and second circuits 74, 78.

For example, during extension of the first linear actuator shown in FIG. 2, controller 140 may generate a control signal that causes third pump 84 of third circuit 82 to increase its displacement and discharge pressurized fluid into common discharge passage 114 at a greater rate, and/or a control signal that causes spool element 134 of control valve 122 to move toward the first position. As described above, when spool element 134 moves toward the first position, common discharge passage 114 may be increasingly fluidly communicated with first-circuit passage 116 such that fluid flows from third circuit 82 into first circuit 74 at a greater rate. When fluid from third pump 84 is directed into first circuit 74, makeup fluid may be supplied to third pump 84 either from a charge circuit (not shown) or from second circuit 78, as conditions allow (e.g., from second circuit 78 during retraction of the second linear actuator, otherwise from the charge circuit).

Operation of the first and second rotary actuators in two different directions, including force control via pressure modulation by first and second modulation valves 101, 117, may be substantially identical to the extension and retraction operations of the first and second linear actuators described above. Accordingly, description of the operation of these actuators is omitted from this disclosure.

During retraction of the first linear actuator shown in FIG. 2, controller 140 may generate a control signal that causes third pump 84 of third circuit 82 to increase its displacement and discharge pressurized fluid into common discharge passage 114 at a greater rate and/or a control signal that causes spool element 134 of control valve 122 to move toward the third position. As described above, when spool element 134 moves toward the third position, common discharge passage 114 may be increasingly fluidly communicated with second-circuit passage 118 such that fluid flows from third circuit 82 into second circuit 78 at a greater rate. When fluid from third pump 84 is directed into second circuit 78, makeup fluid may be supplied to third pump 84 either from a charge circuit (not shown), from first circuit 74 during extension of the second actuator, and/or from second circuit 78 during retraction of the second actuator, as conditions allow.

First and/or second circuits 74, 78 may also be configured to selectively direct fluid to the other circuits under particular conditions. For example, during retraction of the first linear actuator, while first pump 76 is supplying pressurized fluid to second chamber 54, first chamber 52 may be discharging fluid in excess of the amount being drawn into first pump 76. At this time, the excess fluid may be directed to second or third pumps 80, 84 via first or first and second intake passages 126, 128. Also at this time, one or both of first and second isolation valves 130, 132 may moved to their flow-passing positions, depending on the circuit(s) in need of the pressurized fluid. This fluid, particularly if highly-pressurized (as may be the case during an overrunning condition), may help reduce the power consumption of the fluid-receiving pump(s) and/or even be used to drive the fluid-receiving pump(s) as a motor to return energy back to power source 18. If, during the discharge of pressurized fluid from first circuit 74, second circuit 78 does not have need for pressurized fluid, the fluid may be directed through third pump 84 and into tank 112 via common discharge passage 114, unloading valve 125, and return passage 120. Second isolation valve 132 may be moved to the flow-blocking position at this time. Because common discharge passage 114 may be connected to tank 112 when receiving fluid from first and/or second circuits 74, 78, the pressure differential across third pump 84 may be large, allowing for a large amount of energy to be recuperated from the pressurized fluid. The discharge of excess fluid from second circuit 78 may function in a similar manner.

It may be possible in some situations for first circuit 74 to discharge fluid to third circuit 82 at the same time that third circuit 82 is discharging fluid to second circuit 78. In this situation, when the fluid demand from second circuit 78 is less than the fluid supplied to third circuit 82 by first circuit 74, spool element 134 of control valve 122 may be moved to an in-between position, such that some fluid is directed to tank 112 via unloading valve 135 and the remaining fluid is passed further along second circuit 78. A similar situation may occur during discharge of fluid from second circuit 78 to third circuit 82.

In the disclosed hydraulic system, flows provided by the different pumps may be substantially unrestricted during modulation of the associated hydraulic actuators such that significant energy is not unnecessarily wasted in the actuation process. Thus, embodiments of the disclosure may provide improved energy usage and conservation. In addition, the closed-loop operation of hydraulic system 72 may, in some applications, allow for a reduction or even complete elimination of metering valves for controlling fluid flow associated with the linear and rotary actuators. This reduction may result in a less complicated and/or less expensive system.

The disclosed hydraulic system may also provide for force modulation of the different actuators. In particular through pressure control facilitated by modulation valves 101, 117, an operator of machine 10 may be provided with an additional way in which the movement of work tool 14 may be manipulated. This control may provide for enhanced performance of machine 10.

It will be apparent to those skilled in the art that various modifications and variations can be made to the disclosed hydraulic system. Other embodiments will be apparent to those skilled in the art from consideration of the specification and practice of the disclosed hydraulic system. For example, it is contemplated that control valves 94, 107, and/or 122 may embody non-spool type valves and/or non-pilot operated types of valves, if desired. For example, direct solenoid operated valves having poppet-type elements may be utilized. It is intended that the specification and examples be considered as exemplary only, with a true scope being indicated by the following claims and their equivalents.

What is claimed is:

1. A hydraulic system, comprising:
   a unidirectional variable displacement first pump;
   a first actuator connected to the first pump via a closed-loop first circuit;
   a first switching valve disposed between the first actuator and the first pump and configured to control a fluid flow direction through the first actuator;
   a second actuator connected to the first pump in parallel with the first actuator via the first circuit;
   a second switching valve disposed between the second actuator and the first pump and configured to control a fluid flow direction through the second actuator;
   a modulation valve associated with the first circuit and configured to selectively modulate a pressure of the first circuit during actuation of the first or second switching valves;
   a unidirectional variable displacement second pump;
   a third actuator connected to the second pump via a closed-loop second circuit; and
   a unidirectional variable displacement third pump selectively connectable in closed-loop manner to the first or second circuits.

2. The hydraulic system of claim 1, wherein the modulation valve is configured to increase the pressure of the first circuit as an operator requests movement of the first or second actuators with greater force.

3. The hydraulic system of claim 2, wherein:
   the first actuator is a linear actuator; and
   the second actuator is a rotary actuator.

4. The hydraulic system of claim 2, wherein each of the first and second switching valves is a three-position, four-way valve.

5. The hydraulic system of claim 1, further including:
   a low-pressure tank;
   an unloading valve connected to the low-pressure tank via a return passage; and a control valve associated with the third pump and configured to control fluid flow from the third pump into the first circuit, the second circuit, or the low-pressure tank via the unloading valve.

6. The hydraulic system of claim 5, wherein the control valve is a variable position, four-way valve.

7. The hydraulic system of claim 1, wherein:
the first circuit is configured to selectively direct fluid to the second and third pumps; and
the second circuit is configured to selectively direct fluid to the first and third pumps.

8. The hydraulic system of claim 7, further including:
a first isolation valve disposed between intakes of the first and third pumps; and
a second isolation valve disposed between intakes of the second and third pumps.

9. The hydraulic system of claim 7, wherein, the third pump is fluidly connected to the low-pressure tank when the first or second circuit directs fluid to the third pump.

10. The hydraulic system of claim 1, further including:
a first check valve disposed between the first pump and the first and second actuators; and
a second check valve disposed between the second pump and the third actuator,
wherein:
the third pump connects to the first circuit at location between the first check valve and the first and second actuators; and
the third pump connects to the second circuit at a location between the second check valve and the third actuator.

11. The hydraulic system of claim 10, wherein the modulation valve is a variable position, two-way valve connected to the discharge passage of the first pump at a location upstream of the first check valve.

12. A hydraulic system, comprising:
a unidirectional variable displacement first pump;
a first actuator connected to the first pump via a closed-loop first circuit;
a first switching valve disposed between the first actuator and the first pump, the first switching valve being movable between a first position at which fluid from the first circuit passes through the first actuator in a first direction, a second position at which fluid flow through the first actuator is substantially blocked, and a third position at which fluid from the first circuit passes through the first actuator in a second direction;
a second actuator connected to the first pump in parallel with the first actuator via the first circuit;
a second switching valve disposed between the second actuator and the first pump, the second switching valve being movable between a first position at which fluid from the first circuit passes through the second actuator in a first direction, a second position at which fluid flow through the second actuator is substantially blocked, and a third position at which fluid from the first circuit passes through the second actuator in a second direction;
a modulation valve associated with the first circuit and configured to selectively increase a pressure of the first circuit as an operator requests movement of the first or second actuators with greater force;
a unidirectional variable displacement second pump;
a third actuator connected to the second pump via a closed-loop second circuit;
a unidirectional variable displacement third pump selectively connectable in closed-loop manner to the first or second circuits; and
a control valve associated with the third pump and configured to control fluid flow from the third pump into the first and second circuits.

13. The hydraulic system of claim 12, wherein;
the first actuator is a boom actuator;
the second actuator is a travel motor; and
the third actuator is a stick actuator.

14. The hydraulic system of claim 12, wherein:
the first and second switching valves are three-position, four-way valves;
the modulation valve is a variable-position valve, two-way valve; and
the control valve is a variable-position, four-way valve.

15. A method of operating a hydraulic system, comprising:
discharging pressurized fluid with a first pump in a single direction;
directing the pressurized fluid to a first linear actuator via a closed-loop first circuit;
selectively switching a fluid flow direction through the first actuator via a first switching valve;
directing the pressurized fluid to a second linear actuator via the closed-loop first circuit;
selectively switching a fluid flow direction through the second actuator via a second switching valve;
selectively adjusting an amount of fluid from the first circuit that bypasses the first or second actuators via a modulation valve during actuation of the first or second switching valves;
discharging pressurized fluid with a second pump in a single directionn;
directing the pressurized fluid from the second pump to a third hydraulic actuator via a closed-loop second circuit;
discharging pressurized fluid with a third pump in a single direction; and
selectively directing the pressurized fluid from the third pump to the first circuit, to the second circuit, or to a low-pressure tank.

16. The method of claim 15, wherein selectively adjusting the amount of fluid bypassing the first or second actuators includes reducing the amount of fluid bypassing the first or second actuators as an operator requests movement of the first or second actuators with greater force.

17. The method of claim 15, wherein selectively directing the pressurized fluid from the third pump to the first circuit, to the second circuit, or to the low-pressure tank includes selectively directing a portion of the pressurized fluid from the third pump to the low-pressure tank and a remaining portion of the pressurized fluid to one of the first and second circuits.

18. The method of claim 15, further including selectively isolating the second pump or the second and third pumps from the first circuit.

* * * * *